US009485145B1

(12) United States Patent
Bonczkowski et al.

(10) Patent No.: US 9,485,145 B1
(45) Date of Patent: Nov. 1, 2016

(54) SYSTEM, METHOD, APPARATUS, AND COMPUTER PROGRAM PRODUCT FOR DETERMINING A CONFIGURATION OF A CONVERGED INFRASTRUCTURE

(71) Applicant: VCE Company, LLC, Richardson, TX (US)

(72) Inventors: Joshua Bonczkowski, Apex, NC (US); Nicholas A. Hansen, Willow Spring, NC (US); Matthew Molner, Cary, NC (US)

(73) Assignee: VCE Company, LLC, Richardson, TX (US)

( * ) Notice: Subject to any disclaimer, the term of this patent is extended or adjusted under 35 U.S.C. 154(b) by 255 days.

(21) Appl. No.: 14/088,997

(22) Filed: Nov. 25, 2013

(51) Int. Cl.
H04L 15/16 (2006.01)
H04L 12/24 (2006.01)
H04L 9/32 (2006.01)
H04L 12/26 (2006.01)
H04N 21/254 (2011.01)
G06F 9/445 (2006.01)
G06F 21/10 (2013.01)

(52) U.S. Cl.
CPC ......... H04L 41/0866 (2013.01); H04L 9/3213 (2013.01); H04L 43/08 (2013.01); G06F 8/65 (2013.01); G06F 21/10 (2013.01); H04N 21/2541 (2013.01)

(58) Field of Classification Search
None
See application file for complete search history.

(56) References Cited

U.S. PATENT DOCUMENTS

| 7,739,365 | B2 * | 6/2010 | Kamenetsky | H04L 29/06027 709/203 |
| 7,886,048 | B1 * | 2/2011 | Holland | H04L 67/22 704/277 |
| 7,908,352 | B2 * | 3/2011 | Kamenetsky | H04L 29/06027 709/219 |
| 8,554,681 | B1 * | 10/2013 | Wieder | G06F 21/10 705/51 |
| 2003/0204742 | A1 * | 10/2003 | Gupta | H04L 29/12009 726/22 |
| 2008/0040807 | A1 * | 2/2008 | Lu | H04N 21/2541 726/26 |
| 2009/0144719 | A1 * | 6/2009 | Pazdziora | G06F 8/65 717/171 |
| 2009/0224874 | A1 * | 9/2009 | Dewar | G06F 21/32 340/5.53 |

(Continued)

Primary Examiner — Ranodhi Serrao
Assistant Examiner — James Fiorillo
(74) Attorney, Agent, or Firm — Womble Carlyle Sandridge & Rice LLP; Jeffrey R. McFadden, Esq.

(57) ABSTRACT

A system, method, apparatus, and computer program product for determining a configuration of a converged infrastructure are disclosed. A method may include performing a scan of network addresses for components of the converged infrastructure. The method may further include capturing fingerprints of components discovered by the scan. The method may additionally include identifying the components discovered by the scan based at least in part on a comparison between each captured fingerprint and one or more known component fingerprints in a fingerprint library, which may include a set of known component fingerprints and associated component identities. The method may further include accessing at least one identified component. The method may also include determining a component configuration of each of at least one accessed component.

17 Claims, 6 Drawing Sheets

(56) References Cited

U.S. PATENT DOCUMENTS

| | | | |
|---|---|---|---|
| 2009/0265701 A1* | 10/2009 | Naslavsky | G06F 8/61 717/172 |
| 2010/0242028 A1* | 9/2010 | Weigert | G06F 21/16 717/131 |
| 2011/0125894 A1* | 5/2011 | Anderson | H04L 9/3213 709/224 |
| 2011/0126197 A1* | 5/2011 | Larsen | H04L 9/3213 718/1 |
| 2011/0126275 A1* | 5/2011 | Anderson | H04L 9/3213 726/8 |
| 2012/0240185 A1* | 9/2012 | Kapoor | H04L 63/1425 726/1 |
| 2013/0103786 A1* | 4/2013 | Miglore | G06F 17/30 709/217 |
| 2013/0238720 A1* | 9/2013 | Tulasidas | H04L 67/1095 709/206 |
| 2014/0189092 A1* | 7/2014 | Zhang | H04L 41/5019 709/224 |
| 2014/0351425 A1* | 11/2014 | Madani | H04L 43/08 709/224 |
| 2015/0039871 A1* | 2/2015 | Shetty | G06F 9/5011 713/1 |
| 2015/0172117 A1* | 6/2015 | Dolinsky | H04L 41/0893 709/221 |

* cited by examiner

SYSTEM, METHOD, APPARATUS, AND COMPUTER PROGRAM PRODUCT FOR DETERMINING A CONFIGURATION OF A CONVERGED INFRASTRUCTURE

FIELD OF THE DISCLOSURE

Aspects of the disclosure relate to converged infrastructure computing technology and, more particularly, to a system, method, apparatus, and computer program product for determining a configuration of a converged infrastructure.

BACKGROUND

Converged infrastructure computing is rapidly gaining in popularity, as more and more entities deploying IT platforms are choosing to deploy converged infrastructure systems as part of an integrated information technology (IT) solution. In this regard, converged infrastructure packages multiple IT components, such as servers, data storage devices, networking equipment, and software for IT infrastructure management into a single, optimized computing solution. The integrated solution provided by a converged infrastructure can reduce complexity of deployment, increase IT infrastructure reliability, and reduce management costs compared to conventional IP platforms assembled from individually acquired and assembled components and software packages, as converged infrastructure can provide an integrated set of components selected and assembled by a single vendor into an integrated platform providing guaranteed component interoperability and software compliance. Moreover, converged infrastructure can provide an integrated pool of computing, storage, and networking resources (e.g., a cloud-based computing model) that can be shared by multiple applications and/or users.

While a converged infrastructure acquired from a vendor can provide an integrated IT solution, individual converged infrastructure configurations vary such that an individual maintaining, upgrading, and/or otherwise servicing a converged infrastructure may not know the configuration of the converged infrastructure (e.g., what is contained in the converged infrastructure). In this regard, converged infrastructure vendors often offer multiple models, each of which may have a different configuration, and often upgrade and tweak component configurations within a model over the life cycle of the model. Further, customers deploying converged infrastructures may implement their own on-site modifications to a converged infrastructure, such as through software upgrades and/or the addition of new hardware components. Lack of knowledge of the configuration of a converged infrastructure often presents difficulties when looking to upgrade software and/or hardware components of the converged infrastructure, as an IT technician may need to ensure that the desired upgrade is compatible with the existing configuration in order to ensure continued interoperability between components of the converged infrastructure after the upgrade.

SUMMARY

A system, method, apparatus, and computer program product for determining a configuration of a converged infrastructure are disclosed. For example, a method in accordance with some example embodiments may include performing a scan of network addresses for components of the converged infrastructure. The method may further include capturing fingerprints of components discovered by the scan. The method may additionally include identifying the components discovered by the scan based at least in part on a comparison between each captured fingerprint and one or more known component fingerprints in a fingerprint library, which may include a set of known component fingerprints and associated component identities. The method may further include accessing at least one identified component. The method may also include determining a component configuration of each of at least one accessed component. Accordingly, various example embodiments disclosed herein provide for automated determination of the configuration of a converged infrastructure.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
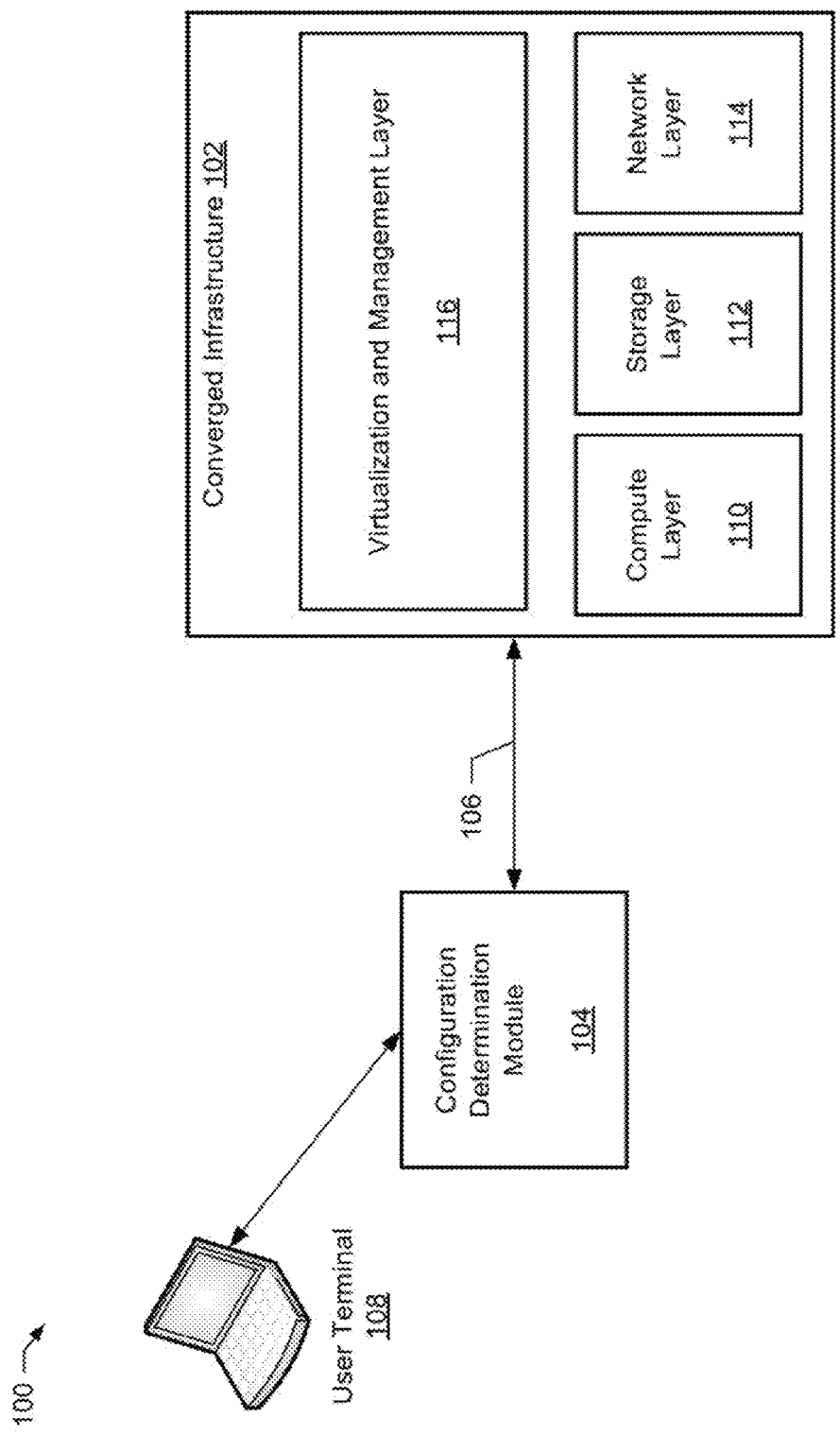
Figure 2:
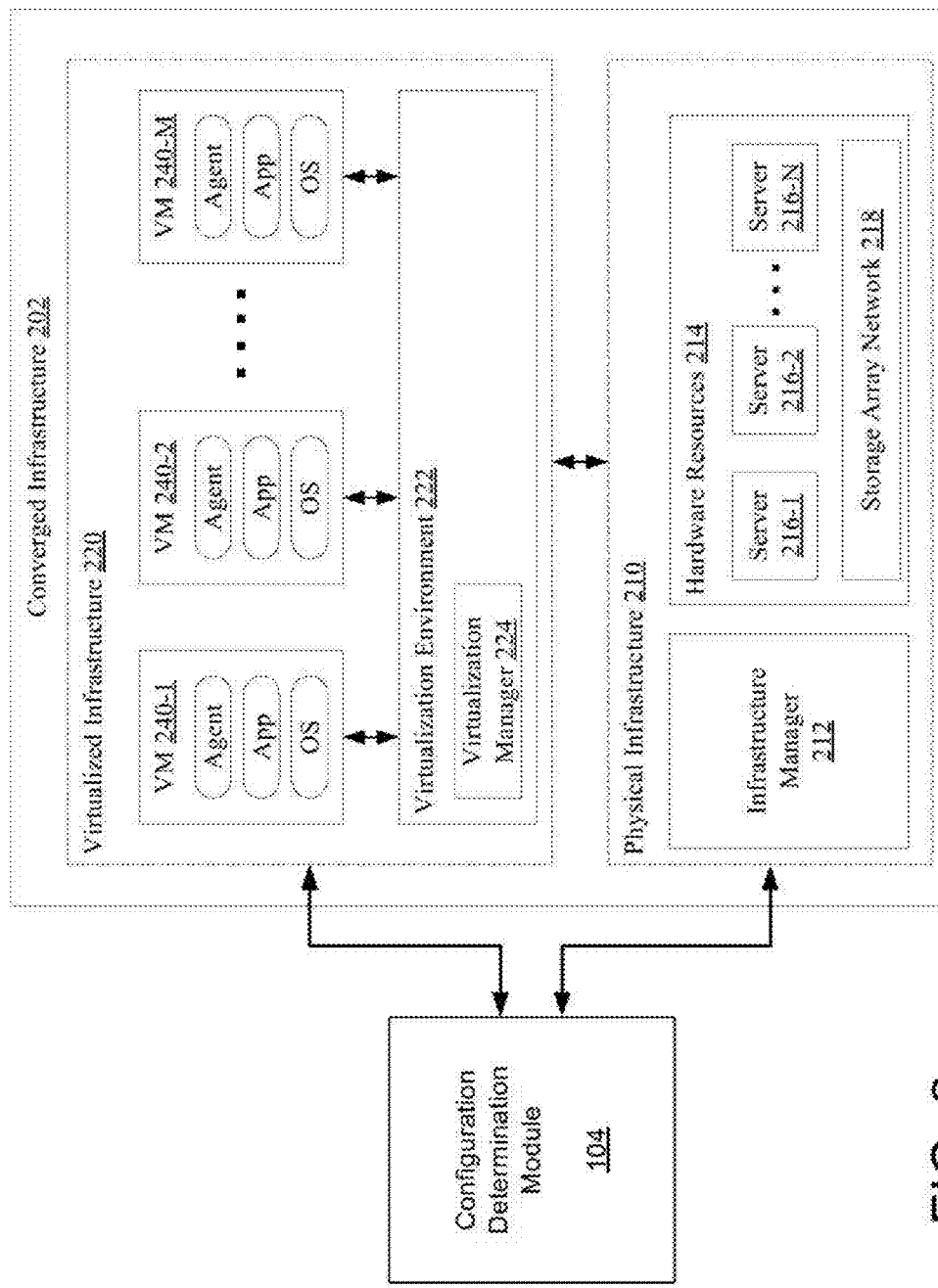
Figure 3:
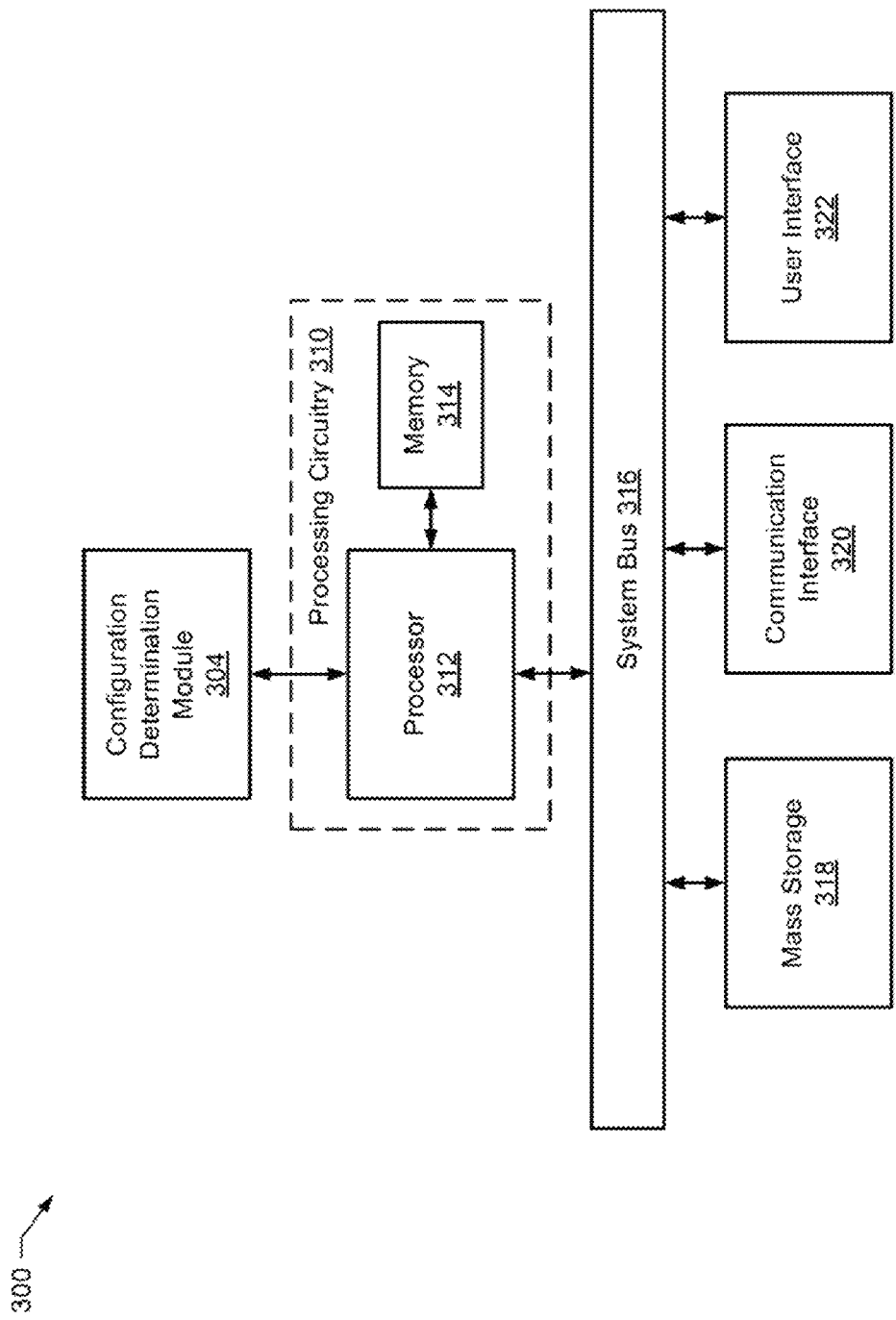
Figure 4:
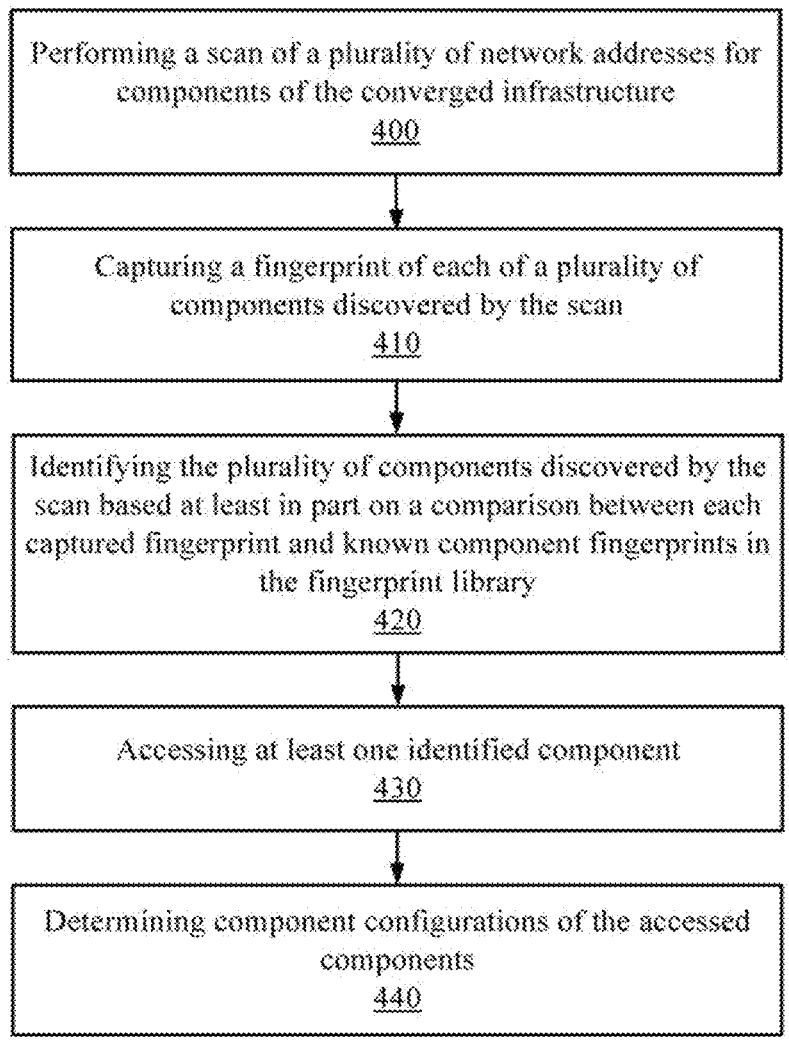
Figure 5:
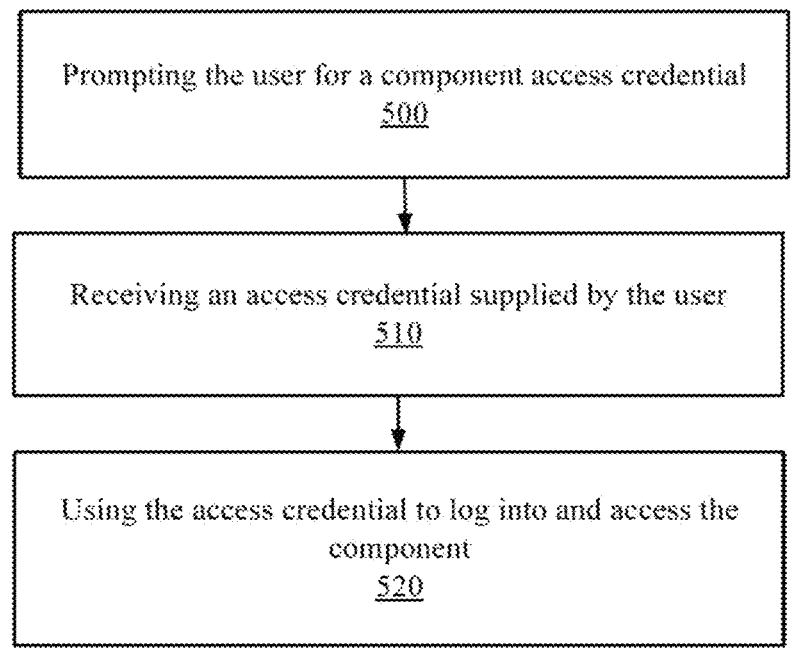
Figure 6:
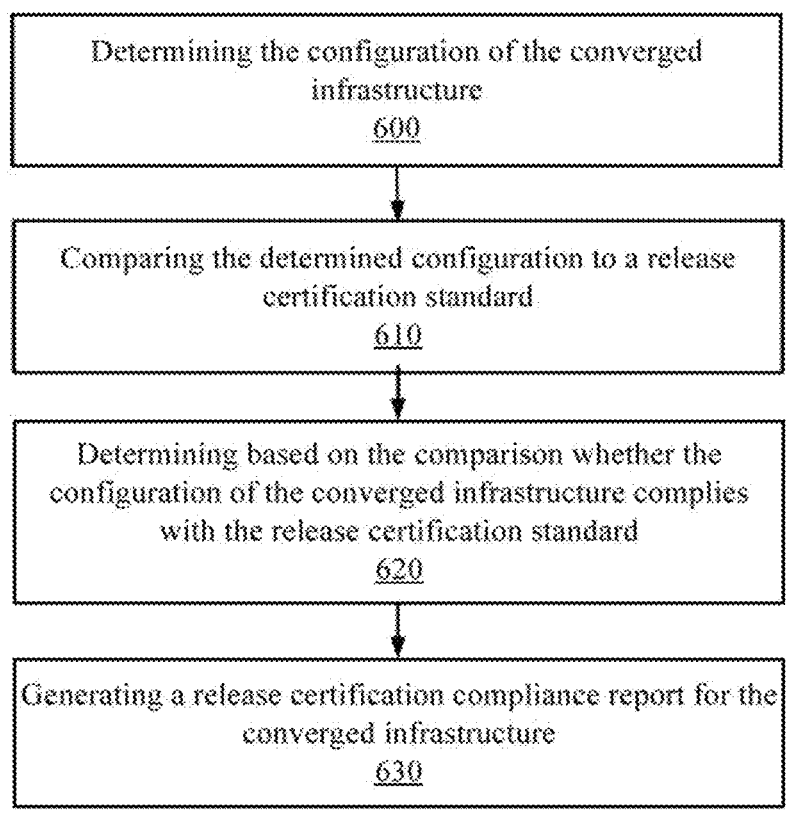

Having thus described the disclosure in general terms, reference will now be made to the accompanying drawings, which are not necessarily drawn to scale, and wherein:

FIG. 1 illustrates a system for determining a configuration of a converged infrastructure in accordance with some example embodiments;

FIG. 2 illustrates a block diagram of an architecture of an example converged infrastructure in accordance with some example embodiments;

FIG. 3 illustrates a block diagram of an example computing system that may be used to implement some example embodiments;

FIG. 4 illustrates a flowchart according to an example method for determining a configuration of a converged infrastructure in accordance with some example embodiments;

FIG. 5 illustrates a flowchart according to an example method for accessing a discovered component of a converged infrastructure in accordance with some example embodiments; and FIG. 6 illustrates a flowchart according to an example method for determining compliance of a configuration of a converged infrastructure with a release certification standard in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates a system 100 for determining a configuration of a converged infrastructure 102 in accordance with some example embodiments. The system 100 may include a converged infrastructure 102, which may be embodied as any converged infrastructure. In this regard, the converged infrastructure 102 may include a plurality of components, such as servers, data storage devices, network equipment, and associated software, which may collectively form the converged infrastructure 102. By way of non-limiting example, in some embodiments, the converged infrastructure 102 may be implemented by a Vblock™ System available from the VCE Company, LLC of Richardson, Tex.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component(s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization and management layer 116, which may include one or more virtualization components configured to support one or more virtualized computing environments and/or one or more management components configured to support management of the converged infrastructure 102. The components of the virtualization and management layer 116 may include components embodied in software, hardware, firmware, and/or some combination thereof. For example, the virtualization and management layer 116 may include a hypervisor and/or other virtualization components that may be configured to create and run virtual machines and/or to otherwise virtually simulate a computing environment. As a further example, the virtualization and management layer 116 may include a management infrastructure, which may provide management resources for managing the converged infrastructure 102. In some embodiments, the management infrastructure may be a separate system from the converged infrastructure, but may be connected to the converged infrastructure to allow management of the entire converged infrastructure 102. In some example embodiments, the virtualization and management layer 116 may utilize physical hardware resources of the compute layer 110, storage layer 112, and/or network layer 114 to support operation of one or more components of the virtualization and management layer 116. Additionally or alternatively, in some example embodiments, the virtualization and management layer 116 may include dedicated physical resources (e.g., physical hardware components) that may provide computing, storage, and/or network communication resources to one or more components of the virtualization and management layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization and management layer 116 as described above may not be mandatory and thus some may be omitted in certain embodiments. Additionally, the converged infrastructure 102 of some embodiments may include further or different layers and/or components beyond those illustrated in and described with respect to FIG. 1. A block diagram of an example converged infrastructure architecture that may be implemented by the converged infrastructure 102 of some example embodiments is illustrated in and described below with respect to FIG. 2.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

The system 100 may further include a configuration determination module 104, which may be configured to determine a configuration of the converged infrastructure 102 in accordance with one or more embodiments disclosed herein. In this regard, the configuration determination module 104 of some example embodiments may be configured to discover and identify components implemented on the converged infrastructure 102, such as components that may be included in the compute layer 110, storage layer 112, network layer 114, and/or virtualization and management layer 116. The configuration determination module 104 may be further configured to determine a component configuration of a discovered component, such as, where applicable, a hardware configuration of a component (e.g., hardware installed on the component) and/or software configuration of a component (e.g., software, firmware, and/or the like installed on the component). The configuration determination module 104 of some example embodiments may be configured to generate a report(s) detailing the determined configuration of the converged infrastructure 102. The report(s) may include components installed on the converged infrastructure 102 and what versions of firmware, Basic Input/Output System (BIOS), software, and/or the like are installed on the components of the converged infrastructure 102.

The configuration determination module 104 may be embodied as various means, such as circuitry, hardware, a computer program product including a computer readable medium storing computer readable program instructions (e.g., software, firmware, and/or the like) executable by a processing device, a specially programmed computer(s) or processor(s), or some combination thereof. For example, in some embodiments, the configuration determination module 104 may be at least partially implemented by software that may be loaded on and executed by a computing device to configure the computing device to determine the configuration of the converged infrastructure 102 in accordance with one or more embodiments disclosed herein. As one particular example, in some embodiments, the configuration determination module 104 may be loaded on and/or executed by a computing platform of the converged infrastructure 102, such as a physical computing platform that may be included in the compute layer 110 and/or a virtual platform that may be provided by the virtualization and management layer 116. As another particular example, in some embodiments, the configuration determination module 104 may be loaded on and/or executed by a computing device, such as the user terminal 108, which may be communicatively coupled to the converged infrastructure 102 such that the computing device may be configured by the configuration determination module 104 to discover and communicate with components of the converged infrastructure 102. In this regard, in some embodiments, a computing device, such as the user terminal 108, may be communicatively coupled with the converged infrastructure 102 via one or more networks (e.g., one or more wireline networks, one or more wireless networks, a virtual private network (VPN), the Internet, or some combination thereof) or via a direct wireless or wireline link to the converged infrastructure.

In some example embodiments, the configuration determination module 104 may be embodied as and/or otherwise contained on a bootable computer readable storage medium storing computer readable program instructions (e.g., software), that may be loaded on and executed by a computing device to boot the computing device to a configuration configuring the computing device (e.g., a processor(s) of the computing device) to implement functionality of the configuration determination module 104 such that the computing device may be configured to determine the configuration of the converged infrastructure 102 in accordance with one or more example embodiments. In some such embodiments, the bootable computer readable storage medium may include a lightweight operating system (OS), such as a Linux kernel, to which a computing device may be booted, which may include an application and/or otherwise be configured to control the computing device to determine the configuration of the converged infrastructure 102 in accordance with one or more example embodiments. It will be appreciated that any computer readable storage medium that may be used to boot a computing device may be used in accordance with such example embodiments. For example, in some example embodiments, the configuration determination module 104 may be embodied as and/or otherwise contained on a flash memory device, such as a Universal Serial Bus (USB) flash drive, which may be inserted in a USB port and/or other port of a computing platform. As a further example, in some embodiments, the configuration determination module 104 may be embodied as and/or otherwise contained on a bootable optical disc, such as a bootable digital versatile disc (DVD), bootable compact disc read only memory (CD-ROM), bootable compact disc-recordable disc (CD-R), bootable compact disc-rewritable disc (CD-RW), bootable Blu-Ray disc, or the like, which can be inserted into an optical drive implemented on or otherwise operatively coupled with a computing device.

In some example embodiments in which the configuration determination module 104 is embodied as and/or otherwise contained on a bootable computer readable storage medium, the bootable computer readable storage medium may be used to boot a computing platform implemented on the converged infrastructure 102 to a configuration configuring the computing platform to implement functionality of the configuration determination module 104. For example, in some embodiments in which the configuration determination module 104 is embodied as and/or otherwise contained on a USB flash memory drive, the USB flash memory drive may be inserted into a USB port that may be implemented on the converged infrastructure 102 to boot a computing platform of the converged infrastructure 102 to a configuration configuring the computing platform to implement functionality of the configuration determination module 104. Similarly, in some embodiments in which the configuration determination module 104 is embodied as and/or otherwise contained on an optical disc, the optical disc may be inserted into an optical drive that may be operatively coupled with a computing platform of the converged infrastructure 102 to boot the computing platform to a configuration configuring the computing platform to implement functionality of the configuration determination module 104.

In some embodiments, the configuration determination module 104 may be configured to discover and access components of the converged infrastructure 102 via an interface 106 between the configuration determination module 104 and the converged infrastructure 102. In some example embodiments, the interface 106 may include one or more networks, such as one or more wireless networks, one or more wireline networks, a VPN, the Internet, or some combination thereof, via which a computing device implementing the configuration determination module 104 of some example embodiments may communicate with the converged infrastructure 102.

Additionally or alternatively, in some embodiments, the interface 106 may include a physical interface implemented on the converged infrastructure 102. For example, in some embodiments in which the configuration determination module 104 may be executed on and/or otherwise implemented on a computing platform of the converged infrastructure 102, the interface 106 may be at least partially provided by aspects of the network layer 114 and/or other interface(s) that may be internal to the converged infrastructure 102. As a further example, in some embodiments in which the configuration determination module 104 may be embodied as and/or otherwise contained on a bootable computer readable storage medium, the interface 106 may be at least partially provided by a physical interface that may be used to boot a computing platform implemented on the converged infrastructure 102 to the bootable computer readable storage medium, such as a physical port (e.g., a USB port) to which the bootable computer readable storage medium may be coupled, an interface between an optical drive into which the bootable computer readable storage medium may be inserted and one or more components of the converged infrastructure 102, and/or the like.

The user terminal 108 may be embodied as any computing device or user interface for a computing platform that may be used by a user to interact with the configuration determination module 104 to facilitate determination of the configuration of the converged infrastructure 102 and/or to view output results of a determined configuration that may be output by the configuration determination module 104. By way of non-limiting example, the user terminal 108 may be embodied as a personal computer, such as a desktop computer, laptop computer or other personal computer; a mobile computing device, such as a tablet computer, smart phone, or other mobile computing device; an access terminal implemented on, connected to, and/or otherwise associated with the converged infrastructure 102, such as may be used to manage the converged infrastructure 102; and/or other suitably configured computing device or computing platform interface. In some example embodiments, such as some embodiments in which the configuration determination module 104 is loaded on and/or executed the user terminal 108, the user terminal 108 may be communicatively coupled with the converged infrastructure 102 via the interface 106.

In some example embodiments, the user terminal 108 may be used by a user to direct the configuration determination module 104 to a location(s) at which components of the converged infrastructure 102 may be discovered. For example, in some example embodiments, a user may provide one or more network addresses to the configuration determination module 104, which the configuration determination module 104 may scan for components of the converged infrastructure 102. For example, in some embodiments, a user may specify a network address range, such as a subnet, for the configuration determination module 104 to scan for components of the converged infrastructure 102.

In some example embodiments, the user terminal 108 may be used by a user to provide an access credential(s), such as a login name(s), password(s), and/or other access credential(s) that may be used by the configuration determination module 104 to access and determine a configuration of a component discovered by the configuration determination module 104.

In some example embodiments, the configuration module 104 may be configured to provide a report indicative of a determined configuration of the converged infrastructure 102 to the user terminal 108. In such embodiments, the user may view and/or otherwise interact with the report on the user terminal 108.

FIG. 2 illustrates a block diagram of an architecture of an example converged infrastructure 202 in accordance with some example embodiments. The converged infrastructure 202 may, for example, be an embodiment of the converged infrastructure 102 in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2.

The converged infrastructure 202 may include a physical infrastructure 210 configured to support a virtualized infrastructure 220. In some example embodiments, the physical infrastructure 210 may include hardware resources 214, such as servers 216-1 to 216-N (sometimes referred to as "hosts") and one or more storage array networks (SAN), such as SAN 218, which may be communicatively connected by a network (not shown). The physical infrastructure 210, including hardware resources 214 may, for example, provide an embodiment of the compute layer 110, storage layer 112, and network layer 114. For example, the servers 216 may comprise an implementation of the compute layer 110, and the SAN 218 may comprise an implementation of the storage layer 112. The hardware resources 214, including, for example, the servers 216 and SAN 218 may be communicatively connected by an embodiment of the network layer 114.

In some example embodiments, the physical infrastructure 210 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 210. One such example of physical infrastructure 210 is a Vblock™ Infrastructure Platform available from the VCE Company, LLC.

The physical infrastructure 210 may further include an infrastructure manager 212 configured to manage the configuration, provisioning, and policy compliance of the physical infrastructure 210. Infrastructure manager 212 may be configured to provide an interface by which provisioning of hardware resources 214 (e.g., computing, networking, storage) may be managed with policy-based automation. According to some embodiments, the infrastructure manager 212 may be included in every physical infrastructure 210 to manage the configuration, provisioning, and compliance of computing-block based infrastructure. As described in further detail below, the virtualized infrastructure 220 (or component thereof) of some example embodiments may be configured to connect to and communicate with the infrastructure manager 212 to manage and/or configure the physical infrastructure 210 to support operation of components of the virtualized infrastructure 220. One example of an infrastructure manager 212 includes EMC Ionix Unified Infrastructure Manager (UIM) available from EMC Corporation. In some embodiments, the infrastructure manager 212 may further be configured to provide network manager functionality such that the infrastructure manager 212 may be configured to configure network devices (e.g., switches, routers) and manage addressing, subnets, virtual local area networks (VLANs), and/or other network configurations that may be implemented on the converged infrastructure 202. One example of a network manager that may be included on the infrastructure manager 212 of such embodiments is a Cisco Switch, such as may be accessible via a Cisco IOS® command line interface (CLI), available from Cisco System, Inc.

The virtualized infrastructure 220 may include a virtualization environment 222 comprising one or more virtual machines (VM) 240, such as VM 240-1 to VM 240-M. Each virtual machine 340 can have an operating system (OS), one or more applications (APP) and an agent (AGENT). In some embodiments, one or more of the virtual machines 340 may be configured to connect to one or more users by a communications network, such as the Internet. The virtualized infrastructure 220 may, for example, provide at least a portion of an embodiment of the virtualization and management layer 116.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 202 of some example embodiments may be configured to perform physical-to-virtual conversion of hardware resources 214 and/or other physical computing of the physical infrastructure 210 to support or host virtual machines 240 in the virtualized infrastructure 220. In this regard, components of the physical infrastructure 210 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 212 to manage and/or configure the physical infrastructure 210 to support operation of the virtual machines 240. The virtualization manager 224 of some example embodiments may be implemented with the VMware® vCenter® virtualized management platform available from VMware, Inc., of Palo Alto, Calif.

In some example embodiments, virtualization environment 222 may be implemented by running VMware vSphere® and/or VMware ESX®-based hypervisor technologies, available from Vmware, Inc., on servers 216. However, it will be appreciated that any virtualization/hypervisor technology may be used in addition to or in lieu of Vmware hypervisor technologies in accordance with various example embodiments.

As further illustrated in FIG. 2, the configuration determination module 104 of some example embodiments may be configured to interface with the converged infrastructure 202 to determine a configuration of the converged infrastructure 202. As such, the configuration determination module 104 may be configured to discover components and respective component configurations of components included in the physical infrastructure 210 and/or virtualized infrastructure 220 in accordance with such example embodiments.

FIG. 3 illustrates a block diagram of an example computing system 300 that may be used to implement some example embodiments. The computing system 300 may be implemented on any computing device or plurality of computing devices that may be configured to implement one or more example embodiments. By way of non-limiting example, in some embodiments, the computing system 300 may be implemented on the user terminal 108 and/or a computing platform(s) of the converged infrastructure 102.

The computing system may include a plurality of elements, such as configuration determination module 304, processing circuitry 310, mass storage 318, communication interface 320, and user interface 322, which may be interfaced via a system bus 316. It will be appreciated that the components, devices or elements illustrated in and described with respect to FIG. 3 below may not be mandatory and thus some may be omitted in certain embodiments. Additionally, the computing system 300 of some embodiments may include further or different components, devices or elements beyond those illustrated in and described with respect to FIG. 3.

Further, while FIG. 3 illustrates an architecture including elements interfaced via the system bus 316, it will be appreciated that in some example embodiments, elements of the computing system 300 may be implemented in a distributed computing environment in which elements may be distributed across a plurality of computing devices, which may be in communication with each other, such as via a network, to provide functionality of the computing system 300. As such, in some example embodiments, elements of the computing system 300 may be communicatively coupled via a network in addition to or in lieu of the system bus 316.

The computing system 300 of some example embodiments may implement an operating system(s), such as MS DOS™, MS-WINDOWS™, OS/2™, UNIX™, LINUX™, or other known operating systems. It should be appreciated, however, that in some embodiments, one or more aspects of the computing system 300 may be implemented on and/or integrated with a virtualized computing system, such as may be provided by a converged infrastructure (e.g., the converged infrastructure 102 and/or the converged infrastructure 202).

In some example embodiments, the computing system 300 may include processing circuitry 310 that is configurable to perform actions in accordance with one or more example embodiments disclosed herein. In this regard, the processing circuitry 310 may be configured to perform and/or control performance of one or more functionalities for determining a configuration of a converged infrastructure, such as converged infrastructure 102 and/or converged infrastructure 202, in accordance with various example embodiments. Thus, the processing circuitry 310 may be configured to perform data processing, application execution and/or other processing and management services according to one or more example embodiments.

In some example embodiments, the processing circuitry 310 may include a processor 312 and, in some embodiments, such as that illustrated in FIG. 3, may further include memory 314. The processing circuitry 310 may be in communication with (e.g., via system bus 316) and/or otherwise control the configuration determination module 304, mass storage 318, communication interface 320, and/or user interface 322.

The processor 312 may be embodied in a variety of forms. For example, the processor 312 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 300 is embodied as a plurality of computing devices, a plurality of processors, which may collectively form the processor 312, may be distributed across a plurality of computing devices that may be in operative communication with each other directly and/or via a network. In some example embodiments, the processor 312 may be configured to execute instructions that may be stored in a memory, such as the memory 314 and/or the mass storage 318 and/or that may be otherwise accessible to the processor 312. As such, whether configured by hardware or by a combination of hardware and software, the processor 312 may be capable of performing operations according to various embodiments while configured accordingly.

In embodiments including the memory 314, the memory 314 may include read only memory (ROM), random access memory (RAM), and/or the like. The mass storage 318 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 318 may provide a persistent data storage device. In some example embodiments, the mass storage 318 may be configured to provide a backup storage. The mass storage 318 may include a memory device implemented locally to the computing system 300 and/or a memory device remote to the computing system 300, which may be communicatively coupled with the computing system 300, such as via a network. In some embodiments in which the computing system 300 is embodied as a plurality of computing devices, the memory 314 and/or mass storage 318 may include a plurality of memory devices, which may be distributed across a plurality of computing devices that may be in operative communication with each other directly and/or via a network to form the computing system 300.

In some embodiments, the memory 314 and/or the mass storage 318 may provide a non-transitory computer-readable storage medium that may store computer program instructions that may be executed by the processor 312. In this regard, the memory 314 and/or mass storage 318 may be configured to store information, data, applications, instructions and/or the like for enabling the computing system 300 to carry out various functions in accordance with one or more example embodiments. Applications that may be executed by the processor 312 may also be in the form of modulated electronic signals that may be accessed via a network modem or other network interface of the computing system 300.

The computing system 300 may further include a communication interface 320. The communication interface 320 may enable the computing system 300 to communicate (e.g., over a network or other communication interface) with another computing device or system, such as the converged infrastructure 102, user terminal 108, and/or other computing device or system. In this regard, the communication interface 320 may include one or more interface mechanisms for enabling communication with other devices and/or networks. As such, the communication interface 320 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 300 may include the user interface 322. It will be appreciated, however, that in some example embodiments, one or more aspects of the user interface 322 may be omitted, and in some embodiments, the user interface 322 may be omitted entirely. The user interface 322 may be in communication with the processing circuitry 310 to receive an indication of a user input and/or to provide an audible, visual, mechanical, or other output to a user. As such, the user interface 322 may include, for example, a keyboard, a mouse, a joystick, a display, a touch screen display, a microphone, a speaker, one or more biometric input devices, and/or other input/output mechanisms.

In embodiments including a user interface 322, the user interface 322 may be configured to enable a user to provide input to facilitate determining the configuration of a converged infrastructure, such as converged infrastructure 102 and/or converged infrastructure 202. A display and/or other output device of the user interface 322 may be configured to provide for visualization and/or other output of a report(s) indicative of a determined configuration of a converged infrastructure. In some example embodiments one or more aspects of the user interface 322 may be implemented on and/or otherwise provided by the user terminal 108.

The computing system 300 may further include configuration determination module 304. The configuration determination module 304 may be an embodiment of the configuration determination module 104. The configuration determination module 304 may be embodied as various means, such as circuitry, hardware, a computer program product comprising computer readable program instructions stored on a computer readable medium (for example, the memory 314 and/or mass storage 318) and executed by a processing device (for example, the processor 312), or some combination thereof. In some embodiments, the processor 312 (or the processing circuitry 310) may include, or otherwise control the configuration determination module 304. For example, in some embodiments, the processor 312 may be configured to perform functionality of the configuration determination module 304 (e.g., functionality of the configuration determination module 104) through execution of instructions that may be stored on and/or otherwise loaded onto the memory 314 and/or the mass storage 318. In some such embodiments, the configuration determination module 304 may be loaded on a computing platform of the computing system 300 and/or a computing platform of the computing system 300 may be booted to the configuration determination module 304 to configure the processor 312 to perform functionality of the configuration determination module 304.

FIG. 4 illustrates a flowchart according to an example method for determining a configuration of a converged infrastructure, such as converged infrastructure 102 and/or converged infrastructure 202, in accordance with some example embodiments. In this regard, FIG. 4 illustrates operations that may be performed by the configuration determination module 104 in accordance with some example embodiments. One or more elements of the computing system 300, such as the configuration determination module 304, processing circuitry 310, processor 312, memory 314, system bus 316, mass storage 318, communication interface 320, and/or the user interface 322 may, for example, provide means for performing one or more of the operations illustrated in and described with respect to FIG. 4 in accordance with some example embodiments.

Operation 400 may include performing a scan of a plurality of network addresses (e.g., IP addresses) for components of the converged infrastructure. The plurality of network addresses may include a network address range(s), a subnet, and/or other set of network address. In some example embodiments, the plurality of network addresses that may be scanned in operation 400 may be specified by a user, such as via the user terminal 108 and/or the user interface 322. For example, in some embodiments, when using the configuration determination module 104, a user may be prompted for an address(es) at which the converged infrastructure and/or components thereof may be located. The user may specify a network address range, subnet, and/or the like, which may be received by the configuration determination module 104 and scanned for components of the converged infrastructure.

For example, in some embodiments, operation 400 may include iteratively pinging or otherwise sweeping the plurality of network addresses, such as by sending an Internet Control Message Protocol (ICMP) packet to each respective network address, and determining if there is any response from a component on each respective swept network address. In some example embodiments, operation 400 may include looking at particular set of ports of a respective network address to determine if there is a component of the converged infrastructure at the address. Based on the scanning of operation 400, the configuration determination module 104 may discover existence of a plurality of components of the converged infrastructure and an associated set of network addresses of the plurality of network addresses at which discovered components of the converged infrastructure are located.

Operation 410 may include capturing a fingerprint of each of a plurality of the components discovered by the scan. A captured fingerprint of a component may comprise one or more characteristics of the component. For example, in some embodiments, capturing a fingerprint of a discovered component may include determining a port configuration of the discovered component. The port configuration may, for example, include which port(s) are active and/or which port(s) are inactive for the discovered component. In some example embodiments, a captured fingerprint for a discovered component may further include a fingerprint of active software and/or services of the component. For example, in some embodiments, a port configuration that may be determined for a component may include a port mapping between active ports and respective applications and/or services active on the ports.

In some embodiments, operation 410 may include querying a port(s) of a discovered component and receiving a returned response message, such as a simple mail transfer protocol (SMTP). The header and/or content of the returned response message may be examined to determine information that may be used to capture the fingerprint of the discovered component.

Operation 420 may include identifying the components discovered by the scan of operation 400 based at least in part on a comparison between each captured fingerprint and known component fingerprints in a fingerprint library. The fingerprint library may comprise a database of known component fingerprints. In this regard, operation 420 may include looking up a fingerprint captured in operation 410 in the database to determine a known component having a matching fingerprint. Thus, for example, in some embodiments, operation 420 may include determining a component having a port configuration corresponding to the port configuration of a discovered component. In this regard, the characteristics of a discovered component may be compared to the characteristics of one or more known components in order to identify the discovered component.

In some example embodiments, the fingerprint library may be maintained in the memory 314 and/or the mass storage 318. In some example embodiments, the fingerprint library may be maintained remotely, such that the configuration determination module 104 may be configured to access the remotely stored fingerprint library, such as over a network. In embodiments in which at least a portion of the fingerprint library is maintained or cached locally, such as in the memory 314 and/or the mass storage 318, the locally maintained copy of the fingerprint library may be synchronized and/or updated (e.g., periodically) based on a remotely maintained fingerprint library such that new components, updated component fingerprints, and/or the like may be updated to the locally maintained copy.

A known component fingerprint in the fingerprint library may specify a port configuration for a component. As a further example, in some embodiments, a known component fingerprint in the fingerprint library may include a profile indicative of active software and/or services associated with a component. In this regard, a known component fingerprint may define a profile of any information that can be ascertained from fingerprinting a component such that a fingerprint capture for a component may be matched to a known component fingerprint in the fingerprint library.

In some example embodiments, if a known component fingerprint matching a captured fingerprint cannot be found in the fingerprint library and/or if there are known component fingerprints matching a captured fingerprint, the user may be prompted to identify the component. For example, the user may be presented with the captured fingerprint and/or the network address at which the discovered component is located, and the user may be prompted to identify the component. If the component is not a component of the converged infrastructure, the user may select to skip further identification of the component in some example embodiments.

Some components that may be identified in operation 420 may be accessed to determine an internal configuration of the components. For such components, the method may further include operations 430 and 440. Operation 430 may include accessing at least one identified component.

In some example embodiments, operation 430 may include using an access credential(s), such as a login name(s), password(s), and/or other access credential(s), to access a component. In this regard, an access credential may be used to log into and/or otherwise gain authorization to access a component. In some such example embodiments, the access credential(s) may be supplied by the user. For example, in some embodiments, the user may supply the access credential(s) at the outset of the configuration determination process (e.g., prior to performance of operation 400). Additionally or alternatively, in some example embodiments, the user may be prompted to provide access credentials for one or more components identified in operation 420 prior to or during performance of operation 430. Additionally or alternatively, in some example embodiments, the access credential(s) may be maintained in an access credential database, file, or the like, such that the access credential(s) may be available to the configuration determination module 104 without requiring user input.

A more detailed example of operations that may be performed attendant to performance of operation 430 in embodiments in which an access credential provided by a user may be used to access a component is illustrated in FIG. 5. In this regard, FIG. 5 illustrates a flowchart according to an example method for accessing a discovered component of a converged infrastructure, such as converged infrastructure 102 and/or converged infrastructure 202, in accordance with some example embodiments. More particularly, FIG. 5 illustrates operations that may be performed by configuration determination module 104 to facilitate performance of operation 430 in accordance with some example embodiments. One or more elements of the computing system 300, such as the configuration determination module 304, processing circuitry 310, processor 312, memory 314, system bus 316, mass storage 318, communication interface 320, and/or the user interface 322 may, for example, provide means for performing one or more of the operations illustrated in and described with respect to FIG. 5 in accordance with some example embodiments.

Operation 500 may include prompting the user for a component access credential. In some example embodiments, operation 500 may be performed at the outset of the configuration determination process (e.g., prior to performance of operation 400). As another example, in some embodiments, operation 500 may be performed subsequent to identifying a component(s) in operation 420. For example, a user may be prompted with a list of one or more components and asked to supply access credentials for each respective listed component.

Operation 510 may include receiving one or more access credentials supplied by the user. In some example embodiments, the received access credential(s) may include an access credential(s) specified in association with a particular component(s). Additionally or alternatively, in some example embodiments, the component associated with a received access credential may not be specified or otherwise known.

Operation 520 may include using a received access credential to log into and access a discovered component. If the access credential associated with the component is specified by the user and/or is otherwise known to the configuration determination module 104, operation 520 may include selecting the appropriate access credential and accessing the component. Alternatively, in some example embodiments in which a user provides a set of one or more access credentials without specifying the component(s) which the access credential(s) may be used to access, operation 520 may include attempting to access the discovered component with the available access credential(s) until the appropriate access credential is identified and the component is successfully accessed.

Returning to FIG. 4, operation 440 may include determining component configurations of the accessed components. For example, for a hardware component, operation 440 may include determining a hardware configuration (e.g., subcomponents) of the component and/or determining a software configuration installed on the component. As a further example, for a virtualized component, operation 440 may include determining a software configuration and/or virtual hardware configuration for the component. Determination of a software configuration of a component may include determining applications, firmware, BIOS, and/or other software, as well as respective versions thereof that are installed on a component.

As a more particular example, for an identified storage array, operation 440 may include determining how many and/or what type(s) of discs or other storage devices are implemented on the storage array. As another example, for an identified switch, operation 440 may include determining how many ports are implemented on the switch, which ports are active, a software configuration of the switch, and/or the like. As still a further example, for an identified server, operation 440 may include determining any cards and/or other hardware subcomponents implemented on the server, a software configuration of the server, and/or the like.

In some example embodiments, two or more of the operations illustrated in and described with respect to FIG. 4 may be at least partially performed in parallel. For example, in some example embodiments, one or more of operations 410-440 may be performed at least partially in parallel with operation 400. For example, in some embodiments, if a component is discovered during the scan of operation 400, then one or more of operations 410-440 may be performed for the discovered component prior to completing the scan.

In some example embodiments, determination of the configuration of a converged infrastructure may further include determining a topology of the converged infrastructure based on the component identities and component configurations that may be determined in operations 420 and 440. In some example embodiments, the configuration determination module 104 may be configured to generate one or more configuration reports containing configuration information indicative of the determined configuration of the converged infrastructure. The configuration information may include a set of identified components of the converged infrastructure, such as may be determined in operation 420, and associated component configurations for the identified components, such as may be determined in operation 440. The configuration information may further include the respective network addresses of the identified components.

Configuration reports containing configuration information may be generated in any of a variety of formats. For example, in some embodiments, configuration information may be presented in a text-based model. Additionally or alternatively, reports may be generated in any of a variety of formats, such as, Portable Document Format (PDF), Extensible Markup Language (XML), JavaScript Object Notation (JSON), Comma-Separated Value (CSV), and/or other format.

The configuration determination module 104 may be further configured to output a generated configuration report such that it may be viewed and/or otherwise accessed by a user. For example, in some embodiments, a configuration report may be displayed on a display of the user terminal 108 and/or user interface 322. As further examples, in some embodiments, a configuration report may be printed, emailed to a selected email address(es), and/or saved to a memory (e.g., memory 314, mass storage 318, and/or other memory from which the configuration report may be later accessed).

In some example embodiments, the configuration determination module 104 may be configured to determine whether the configuration of a converged infrastructure complies with a release certification standard. A release certification standard may define a set of configuration standards and/or guidelines for the configuration of hardware and/or software components for a given release of a converged infrastructure and/or a component(s) thereof. A release certification standard may be defined in any of a variety of forms and, in some example embodiments, may be defined as a release certification matrix (RCM). For example, in some embodiments, the configuration of a converged infrastructure, such as converged infrastructure 102 and/or converged infrastructure 202, may be determined so that it may be ascertained whether the configuration of the converged infrastructure supports upgrading a component of the converged infrastructure, such as by adding new hardware and/or upgrading/adding software to a component converged infrastructure. In this regard, hardware and/or software may be certified to be compatible with a converged infrastructure satisfying a certain release certification standard. Accordingly, compliance of a converged infrastructure with a release certification standard may be verified before upgrading the converged infrastructure.

FIG. 6 illustrates a flowchart according to an example method for determining compliance of a configuration of a converged infrastructure, such as converged infrastructure 102 and/or converged infrastructure 202, with a release certification standard, such as an RCM, in accordance with some example embodiments. In this regard, FIG. 6 illustrates operations that may be performed by the configuration determination module 104 in accordance with some example embodiments. One or more elements of the computing system 300, such as the configuration determination module 304, processing circuitry 310, processor 312, memory 314, system bus 316, mass storage 318, communication interface 320, and/or the user interface 322 may, for example, provide means for performing one or more of the operations illustrated in and described with respect to FIG. 6 in accordance with some example embodiments.

Operation 600 may include determining the configuration of the converged infrastructure. Operation 600 may be performed in accordance with any of the various embodiments disclosed herein. By way of non-limiting example, in some embodiments, operation 600 maybe performed in accordance with the method of FIG. 4.

Operation 610 may include comparing the determined configuration to a release certification standard. By way of non-limiting example, the release certification standard may be an RCM. However, it will be appreciated that other forms of release certification standards may be used within the scope of the disclosure. In some embodiments, the release certification standard may be a release certification standard specified by the user. In some example embodiments, operation 610 may include comparison of the determined configuration to a plurality of release certification standards to determine with which, if any, release certification standard the determined configuration complies and/or with which the determined configuration is closest to compliance.

Operation 620 may include determining based on the comparison whether the configuration of the converged infrastructure complies with the release certification standard. If the determined configuration does not fully comply with the release certification standard, operation 620 may include flagging distinctions between the determined configuration and the configuration specified in the release certification standard.

Operation 630 may include generating a release certification standard compliance report for the converged infrastructure. In an instance in which the determined configuration does not comply with the release certification standard, the release certification standard compliance report may flag the distinctions between the determined configuration and the configuration specified in the release certification standard.

The release certification standard compliance report may be generated in any of a variety of formats, including, for example, a text-base format, PDF, XML, JSON, CSV, and/or other format. In some example embodiments, the release certification standard compliance report may be output such that it may be viewed and/or otherwise accessed by a user. For example, in some embodiments, the release certification standard compliance report may be displayed on a display of the user terminal 108 and/or user interface 322. As further examples, in some embodiments, the release certification standard compliance report may be printed, emailed to a selected email address(es), and/or saved to a memory (e.g., memory 314, mass storage 318, and/or other memory from which the configuration report may be later accessed).

Having now described systems, apparatuses, and methods for determining the configuration of a converged infrastructure, such as converged infrastructure 102 and/or converged infrastructure 202, in accordance with several example embodiments, an example use case and configuration determination process to determine compliance with an RCM in accordance with some example embodiments in which the configuration determination module 104 is embodied as and/or otherwise contained on a bootable computer readable storage medium will now be described. While the example is described with respect to determining compliance with an RCM, it will be appreciated that the operations and techniques described may be applied mutatis mutandis to determining compliance with any form of a release certification standard within the scope of the disclosure. A user may boot a computing platform implemented on and/or communicatively coupled with the converged infrastructure 102 to the configuration determination module 104. For example, the user may insert a flash drive (e.g., a USB flash drive) into a port of a server that may be implemented on the converged infrastructure 102 and reboot the server to the configuration determination module 104. In accordance with some example embodiments, the computing device that may be booted to the configuration determination module 104 may be booted to an OS, such as a Linux OS version, which may include an application providing functionality of the configuration determination module 104. The application may include components of VCE Vision™, such as JBoss, a System Library, a Compliance Library, and a database, such as a PostgreSQL database.

After booting to the configuration determination module 104, the configuration determination module 104 may find an address, such as through Dynamic Host Configuration Protocol (DHCP) techniques. The configuration determination module 104 may then be reachable (e.g., via a web browser) on the DHCP address. In some embodiments, the bootable OS may not persist any data. Application components, such as a PostgreSQL database, and any file system activities may be configured onto a RAM or other non-persistent media.

In some embodiments, if the user is accessing the application for the first time after booting to the configuration determination module 104, the user may be prompted for a preconfigured user ID and password combination and/or may prompt the user to configure a user ID and password combination. In some example embodiments, however, the usage of a user ID and password combination for accessing and using the configuration determination module 104 may be omitted.

The user may then supply one or more network addresses (e.g., IP addresses), such as a subnet(s), network address range, and/or the like, to be scanned for components of the converged infrastructure 102. The configuration determination module 104 may scan the network addresses specified by the user. In some example embodiments, the configuration determination module 104 may check each network address for a known set of possible ports. When a valid network address with a component (e.g., a host) listening is found, a fingerprint of the component may be captured by the configuration determination module 104. The configuration determination module 104 may compare the captured fingerprint to a set of known component fingerprints in a fingerprint library. The configuration determination module 104 may use the result of the fingerprint comparison to map each respective network address on which a component of the converged infrastructure 102 is found to the type of component found on the network address.

In some example embodiments, the configuration determination module 104 may present one or more found components, such as one or more management servers, to the user and prompt the user to supply the username(s) and password(s) and/or other access credential(s) for the components. After the access credentials have been supplied by the user, the configuration determination module 104 may write out a configuration report file, such as an XML file, including the identified components and perform configuration determination process to determine the configurations of the components identified in the scan. The configuration determination process may include the configuration determination module 104 sending out a message(s), such as via Advanced Message Queuing Protocol (AMQP), for components in the configuration report file that have been fully discovered. The configuration determination module 104 may listen for response events (e.g., AMQP events) to obtain configuration information for the discovered components. For example, in some embodiments, a software process may use access credentials to access discovered components and determine configuration details for the discovered components. The software process may include an interface, such as a representational state transfer (REST) application programming interface (API), configured to enable the configuration determination module 104 to query (e.g., via AMQP messaging) the software process for the configuration details of discovered components.

After all of the identified components have been fully scanned attendant to the configuration determination process, the configuration determination module 104 may present the user with an option to select the type of converged infrastructure 102 (if not already known) and may ask the user to select the RCM version to which the user wishes to compare the converged infrastructure 102. The configuration determination module 104 may, in turn, perform a compliance scan in which the determined configuration of the converged infrastructure 102 may be compared to the selected RCM version.

After the compliance scan has been completed, the configuration determination module 104 may output an RCM compliance report for the converged infrastructure 102. In some example embodiments, the RCM compliance report may be formatted as a file, such as a PDF file, XML file, JSON file, CSV file, and/or other file format that may be downloaded by the user. Additionally or alternatively, in some example embodiments, the configuration determination module 104 may present an RCM compliance report to the user on a display, such as a display of the user terminal 108 and/or a display of the user interface 322. For example, in some embodiments, a compliance score comparing the converged infrastructure 102 to the selected RCM version may be displayed.

The configuration determination module 102 may additionally provide the user with the ability to retrieve a model (e.g., a text-based model) for the configuration of the entire converged infrastructure 102. In some embodiments, the model may be retrieved after the configuration determination process has been completed and the configuration determination module 104 has received the message indicating that all of the identified components have been fully scanned. Any of a variety of formats may be used for the model. For example, in some embodiments, the format of the model may be XML-based or JSON-based. In some embodiments, the System Library may include configuration information for known components that may be used to generate the model based on the determined configuration of the converged infrastructure 102. Post-processing may be performed to store the output in a single structure.

In instances in which a server or other computing platform of the converged infrastructure 102 has been booted to the configuration determination module 104, the computing platform may be reset after completion of the configuration determination process by booting back to a standard, default configuration. For example, if a flash memory drive has been used to boot the computing platform, the flash memory drive may be removed and the computing platform may be powered off and powered back on. The computing platform may then boot into the default OS/configuration and resume its prior function.

While several embodiments have been described herein with respect to determining the configuration of a converged infrastructure, it will be appreciated that systems, methods, apparatuses, and computer program products described herein may be extended to determining the configuration of any computing system within the scope of the disclosure. As such, it will be appreciated that techniques, operations, methods, apparatuses, systems, and the like that have been described herein may be applied mutatis mutandis to determine the components and configuration of computing systems other than converged infrastructures.

It will be understood that each block of the flowcharts in FIGS. 4-6, and combinations of blocks in the flowcharts, may be implemented by various means, such as hardware and/or a computer program product comprising one or more computer readable mediums having computer readable program instructions stored thereon. For example, one or more of the procedures described herein may be embodied by computer program instructions of a computer program product. In this regard, the computer program product(s) which may embody the procedures described herein may be stored by one or more memory devices (e.g., memory 314, mass storage 318, and/or other memory device) of a computing device and executed by a processor in the computing device (e.g., processor 312 and/or other processor). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer readable memories on which the computer program instructions may be stored such that the one or more computer readable memories can cause a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowcharts is provided by way of non-limiting example in order to describe operations that may be performed in accordance some example embodiments. In this regard, it will be appreciated that the ordering of blocks and corresponding method operations illustrated in the flowcharts is non-limiting, such that the ordering of two or more block illustrated in and described with respect to a flowchart may be changed and/or method operations associated with two or more blocks may be at least partially performed in parallel in accordance with some example embodiments. Further, in some embodiments, one or more blocks and corresponding method operations illustrated in and described with respect to a flowchart may be optional, and may be omitted.

Functions in accordance with the above described embodiments may be carried out in many ways. In this regard, any suitable means for carrying out each of the functions described above may be employed to carry out various embodiments. In some embodiments, a suitably configured processor (e.g., processor 312) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 314 and/or mass storage 318. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

Embodiments utilizing a computer program product and/or otherwise employing various computer-implemented operations may employ operations involving data stored in computer systems. These operations include those requiring physical manipulation of physical quantities. In some instances, though not all, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. Moreover, it will be appreciated that a non-transitory computer readable storage medium storing program instructions configured to carry out operations in accordance with one or more embodiments constitutes an article of manufacture.

The disclosed embodiments also relate to a device or an apparatus for performing these operations. The apparatus may be specially constructed to perform a particular embodiment(s), or the apparatus can be a general-purpose computer selectively activated or configured by a computer program stored in and/or otherwise accessible by the computer such that the general-purpose computer is configured to perform operations in accordance with one or more embodiments.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computer program product comprising at least one non-transitory computer readable storage medium having program instructions stored thereon, which when executed by at least one processor, cause the at least one processor to perform a method comprising:

performing a scan of a plurality of network addresses for components of the converged infrastructure;

capturing a fingerprint of each of a plurality of components discovered by the scan, each fingerprint comprising at least one hardware characteristic;

identifying the plurality of components discovered by the scan based at least in part on a comparison between each captured fingerprint and one or more known component fingerprints in a fingerprint library, the fingerprint library comprising a set of known component fingerprints and associated component identities;

accessing at least one identified component;

determining a component configuration of each of at least one accessed component by matching a captured fingerprint for the at least one accessed component with a known component fingerprint in the fingerprint library wherein the determining comprises determining a hardware configuration of the at least one accessed component and determining software installed on the at least one accessed component; and generating configuration information comprising the determined hardware configuration and the determined software installed.

2. The computer program product of claim 1, wherein the method further comprises:

receiving a network address range to scan for components of the converged infrastructure;

wherein performing the scan comprises performing a scan of network addresses within the network address range.

3. The computer program product of claim 1, wherein capturing a fingerprint of each of the plurality of components discovered by the scan comprises determining a port configuration of a first discovered component; and identifying the plurality of components comprises, for the first discovered component, determining a known component fingerprint in the fingerprint library defining a port configuration corresponding to the port configuration of the first discovered component.

4. The computer program product of claim 1, wherein accessing at least one identified component comprises using an access credential to access a first identified component.

5. The computer program product of claim 1, wherein the method further comprises:

using component identities determined by the identifying and determined component configurations to determine a topology of the converged infrastructure.

6. The computer program product of claim 1, wherein the method further comprises:

outputting configuration information indicative of the configuration of the converged infrastructure, the configuration information comprising a set of identified components of the converged infrastructure and associated component configurations determined for the identified components.

7. The computer program product of claim 1, wherein the method further comprises:

determining, based at least in part on identified components of the converged infrastructure and determined component configurations of the identified components, whether the configuration of the converged infrastructure complies with a release certification standard.

8. The computer program product of claim 1, wherein the at least one non-transitory computer readable storage medium comprises a bootable computer readable storage medium comprising instructions, which cause the at least one processor to perform the method when a computer system comprising the at least one processor is booted to the bootable computer readable storage medium.

9. The computer program product of claim 1, wherein the at least one non-transitory computer readable storage medium is embodied on a flash memory device, and wherein the flash memory device is configured to be communicatively coupled with the converged infrastructure via a bus port.

10. A method for determining a configuration of a converged infrastructure, the method comprising:

performing a scan of a plurality of network addresses for components of the converged infrastructure;

capturing a fingerprint of each of a plurality of components discovered by the scan, each fingerprint comprising at least one hardware characteristic;

identifying the plurality of components discovered by the scan based at least in part on a comparison between each captured fingerprint and one or more known component fingerprints in a fingerprint library, the fingerprint library comprising a set of known component fingerprints and associated component identities;

accessing at least one identified component;

determining a component configuration of each of at least one accessed component by matching a captured fingerprint for the at least one accessed component with a known component fingerprint in the fingerprint library wherein the determining comprises determining a hardware configuration of the at least one accessed component and determining software installed on the at least one accessed component; and generating configuration information comprising the determined hardware configuration and the determined software installed, and wherein at least one method operation is executed by a processor.

11. The method of claim 10, further comprising:

receiving a network address range to scan for components of the converged infrastructure;

wherein performing the scan comprises performing a scan of network addresses within the network address range.

12. The method of claim 10, wherein:

capturing a fingerprint of each of the plurality of components discovered by the scan comprises determining a port configuration of a first discovered component; and identifying the plurality of components comprises, for the first discovered component, determining a known component fingerprint in the fingerprint library defining a port configuration corresponding to the port configuration of the first discovered component.

13. The method of claim 10, wherein accessing at least one identified component comprises using an access credential to access a first identified component.

14. The method of claim 10, further comprising:

booting a computing device communicatively coupled with the converged infrastructure to a computer readable storage medium storing an application configured to cause the computing device to perform the method of claim 10, wherein the processor is implemented on the computing device.

15. The method of claim 10, wherein at least one method operation is executed by the processor under control of an application executed by a virtual machine executed on a computing platform of the converged infrastructure.

16. A system for determining a configuration of a converged infrastructure, the system comprising:

at least one memory storing computer program code, wherein the at least one memory and stored computer program code are configured to operate with one or more processors to cause the system to at least:

perform a scan of a plurality of network addresses for components of the converged infrastructure;

capture a fingerprint of each of a plurality of components discovered by the scan, each fingerprint comprising at least one hardware characteristic;

identify the plurality of components discovered by the scan based at least in part on a comparison between each captured fingerprint and one or more known component fingerprints in a fingerprint library, the fingerprint library comprising a set of known component fingerprints and associated component identities;

access at least one identified component;

determine a component configuration of each of at least one accessed component by matching a captured fingerprint for the at least one accessed component with a known component fingerprint in the fingerprint library and determining a hardware configuration of the at least one accessed component and software installed on the at least one accessed component; and generate configuration information comprising the determined hardware configuration and the determined software installed.

17. The system of claim 16, wherein the at least one memory and stored computer program code are configured to operate with one or more processors to further cause the system to:

capture a fingerprint of each of the plurality of components discovered by the scan at least in part by determining a port configuration of a first discovered component; and identify the plurality of components at least in part by, for the first discovered component, determining a known component fingerprint in the fingerprint library defining a port configuration corresponding to the port configuration of the first discovered component.

* * * * *